(12) United States Patent
Harrabida et al.

(10) Patent No.: US 7,961,603 B2
(45) Date of Patent: Jun. 14, 2011

(54) PATH MANAGEMENT FOR ENHANCED PROTECTION

(75) Inventors: Nabil Harrabida, Mississauga (CA); Yves Lemieux, Kirkland (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 812 days.

(21) Appl. No.: 11/610,946

(22) Filed: Dec. 14, 2006

(65) Prior Publication Data

US 2008/0144510 A1     Jun. 19, 2008

(51) Int. Cl.
*H04L 12/26*     (2006.01)
(52) U.S. Cl. .......................... 370/228; 370/389; 709/240
(58) Field of Classification Search .................. 370/216, 370/225, 228, 229, 235, 236, 237, 241, 252, 370/254, 255, 351, 389, 400; 398/1, 2, 5; 709/238, 239, 240, 241, 242, 243, 244; 714/100, 714/1, 2, 3, 4
See application file for complete search history.

(56) References Cited

U.S. PATENT DOCUMENTS

| | | | |
|---|---|---|---|
| 6,976,087 B1 * | 12/2005 | Westfall et al. | 709/238 |
| 2004/0120705 A1 * | 6/2004 | Friskney et al. | 398/5 |
| 2004/0205239 A1 * | 10/2004 | Doshi et al. | 709/241 |
| 2005/0220026 A1 * | 10/2005 | Dziong et al. | 370/237 |
| 2005/0259586 A1 | 11/2005 | Hafid et al. | |

OTHER PUBLICATIONS

Huang et al. "Multi-Class MPLS Resilience Mechanism Supporting Traffic Engineering", Proceedings of the Seventh International Conference on Parallel and Distributed Computing Applications and Technologies, Dec. 4-7, 2006.*
Kompella et al. "Intermediate System to Intermediate System (IS-IS) Extentions in Support of Generalized Multi-Protocol Label Switching (GMPLS)", Network Working Group, Request for Comments 4205, Oct. 2005.*
B. F. Davik, Fairness Aspects of Buffer-Insertion Rings in General and Resilient Packet Rings in Particular, Doctoral Dissertation at the Faculty of Mathematics and Natural Sciences, University of Oslo, Aug. 2005.
A. Autenrieth et al., Engineering End-to-End IP Resilience Using Resilience-Differentiated QoS, IEEE Communciations Magazine, Jan. 2002.
M. Z. Hasan, Internet Traffic Engineering, QoS Engineering, and Service Engineering, TRTF Services Management Group, Jul. 25, 2001.

(Continued)

*Primary Examiner* — Seema S Rao
*Assistant Examiner* — Khoa Huynh
(74) *Attorney, Agent, or Firm* — Dilip C. Andrade; Ericsson Canada Inc.

(57) ABSTRACT

Methods and node capable of establishing link-weights based on protection-factor linked to protection level of a plurality of links between a source node and a destination node and capable of establishing primary and, potentially, protection path proposals using the established link-weights. An available bandwidth value for the link is determined. If the available bandwidth value for the link is greater than the bandwidth requirement associated to the potential path, then the link-weight of the link is set by computing a protection-factor associated to the link with the available bandwidth value for the link. Otherwise, the link-weight of the link is established to a value that indicates that the link should not be part of the potential path. Shortest path algorithm using the established link-weights could be applied to obtain path proposals.

20 Claims, 7 Drawing Sheets

OTHER PUBLICATIONS

A. Autenrieth, Differentiated Resilience in IP-Based Multilayer Transport Networks, Doctoral Dissertation at the Munich University of Technology, Sep. 30, 2002.

M. Holness et al., Mapping of IP/MPLS packets into IEEE 802.17 (Resilient packet ring) Networks, Internet Draft, Nov. 6, 2005.

A. Autenrieth et al., RD-QoS—The Integrated Provisioning of Resilience and QoS in MPLS-based Networks, IEEE 2002.

S. Rai et al., IP Resilience within an Autonomous System: Current Approaches, Challenges, and Future Directions, IEEE Communications Magazine, Oct. 2005.

V. Sharma et al., Framework for Multi-Protocol Label Switching (MPLS)-based Recovery, Network Working Group, RFC 3469, Feb. 2003.

D. Awduche et al., RSVP-TE: Extensions to RSVP for LSP Tunnels, Network Working Group, RFC 3209, Dec. 2001.

International Search Report from corresponding PCT application PCT/IB2007/054738.

Yun Li et al., A joint scheduling power control, and routing algorithm for ad hoc wireless networks, Elsevier, ScienceDirect, May 24, 2006.

\* cited by examiner

PATH MANAGEMENT FOR ENHANCED PROTECTION

TECHNICAL FIELD

The present invention relates to link-weight computation and path establishment in a telecommunications network and, more precisely, to a link-weight establishment mechanism and a path management mechanism for telecommunications networks.

BACKGROUND

Internet Protocol (IP) networks are now being used to transport many types of network traffic. Some of those network traffic types have robustness requirements that were not meant to be supported by IP. For instance, fault (or failure) management in IP networks is not a native functionality thereof. Several mechanisms have been developed to increase survivability to failures over IP. These mechanisms can be classified in two main categories: protection and restoration. The protection mechanisms are designed to react to a failure quickly by redirecting traffic on alternate already established network routes thereby minimizing the impact on the network traffic. To be effective, the protection mechanisms require a level of redundancy of the network's resources that has a cost (e.g., in terms of establishment and maintenance). As for the restoration mechanisms, they assign the network resources necessary dynamically to recover upon acknowledgement of a failure. They are thus slower compared with the protection mechanisms, but have the advantage of using less network resources in normal faultless operation.

One of the weaknesses of the existing protection and restoration mechanisms is that they are setup on particular routes or route portions without considering that different types of traffic with different requirements may be transiting thereon. In addition, the current protection and restoration mechanisms are bound to specific network layers used for specific related services in the network. As a consequence, determination of existing protection or restoration capabilities are likely to be made without taking into account the protection and restoration capabilities that might exist at other layers. This results in network resources waste.

As can be appreciated, there are needs identified to better take traffic type in consideration in protection and restoration mechanisms and to improve utilization of protection and restoration capabilities present at more than one layers.

The present invention aims at providing solutions to some or all of the identified needs.

SUMMARY

A first aspect of the present invention is directed to a method for establishing link-weight of a link on a potential path between a source node and a destination node. The potential path has an associated bandwidth requirement and the link has an associated protection-factor that is set in relation to the level of protection available on the link. The method comprises the steps of determining an available bandwidth value for the link and verifying if the available bandwidth value for the link is equal to or greater than the bandwidth requirement associated to the potential path. If the verification is positive, a step of establishing the link-weight of the link by computing the protection-factor associated to the link with the available bandwidth value for the link follows. Otherwise, the link weight of the link is established to a value that indicates that the link should not be part of the potential path.

A second aspect of the invention is directed to a method for establishing protection-link-weight of a protection-link protecting a portion of a proposed path between a source node and a destination node. The proposed path has an associated bandwidth requirement and the protection link has an associated protection-factor that is set in relation to the level of protection available on the protection-link. The method comprises the steps of determining an available bandwidth value for the protection-link and a reserved bandwidth value for the protection-link. The reserved bandwidth is reserved but not currently used.

The method then follows by verifying if the protection-link is present in the proposed path. If it is, the protection-link-weight of the protection-link is set to a value indicating that the protection-link should not be used to protect the proposed path. If the protection-link is not present in the proposed path, a step verifying if the addition of the available bandwidth value and the reserved bandwidth for the protection-link is equal to or greater than the bandwidth requirement associated to the proposed path is performed. If the result of the verification is positive, the protection-link-weight of the protection-link is established by computing the protection-factor associated to the protection-link with the reserved bandwidth on protection-link and the bandwidth requirement associated to the proposed path. Otherwise, the protection-link weight of the protection-link is set to a value indicating that the protection-link should not be used to protect the proposed path.

A third aspect of the present invention is directed to a method for obtaining a complete-path proposal between a source node and a destination node. The complete-path proposal comprises a primary-path proposal and a protection-path proposal. The complete-path proposal has an associated bandwidth requirement. It is also a prerequisite that there exists more than one chain of links between the source node and the destination node. The method comprises the steps of establishing one link-weight per link of a plurality of links between the source node and the destination node, applying a shortest path algorithm using the established link-weights and obtaining a primary-path proposal comprising a plurality of primary-links from the plurality of links. Thereafter, for each primary-link comprised in the primary-path proposal, the method continues with verifying a level of protection of the primary-link and, if the protection level is below worst than a threshold value, establishing one protection-link-weight per link of a plurality of links between the source node and the destination node. A shortest path algorithm is then applied using the established protection-link-weights in order to obtain a protection-path proposal comprising a plurality of protection-links from the plurality of links. The complete-path proposal is thereby obtained from the primary-path proposal and the protection-path proposal.

A fourth aspect of the present invention is directed to a node in a network. The node is involved in the establishment of a potential path having an associated bandwidth requirement. The potential path is between a source node and a destination node in the network. The node comprises a network-topology module and a link-weight module.

The network-topology module that maintains at least a subset of the network's topology, the subset comprising a bandwidth availability value and a protection factor for each of a plurality of links that are part of the subset.

The link-weight module establishes a link-weight for a first link of the plurality of links. This is done by determining a bandwidth availability value for the first link from the topology, determining a protection-factor for the first link from the topology and verifying if the bandwidth availability value for the first link is equal to or greater than the bandwidth requirement associated to the potential path. If the bandwidth availability value for the first link is equal to or greater than the bandwidth requirement associated to the potential path, the link-weight of the first link is set by computing the protection-factor for the first link with the bandwidth availability value for the first link. Otherwise, the link weight of the first link is set to a value that indicates that the first link should not be part of the potential path.

Optionally, the node may further comprise a path management module that may receive a request for establishment of the potential path between the source node and the destination node and may build a primary-path proposal for the potential path. The primary-path proposal for the potential path may be built by obtaining link-weight information from the link-weight module for a plurality of links between the source node and the destination node and applying a shortest path algorithm using the obtained link-weights thereby obtaining a path proposal comprising a plurality of primary-links from the plurality of links between the source node and the destination node. The link-weight module, as mentioned earlier, establishes a link-weight for each of the plurality of links between the source node and the destination node.

BRIEF DESCRIPTION OF THE DRAWINGS

A more complete understanding of the present invention may be gained by reference to the following 'Detailed description' when taken in conjunction with the accompanying drawings wherein.

DETAILED DESCRIPTION

The present invention provides, among other things, a new and inventive mechanism (implemented as a method or a modular enhancement in one or more nodes) that calculates link-weight of links potentially composing a path between a source and a destination node. The link-weight calculation takes into account, for each link, a protection factor that is set, for a given link, in accordance with the level of protection currently available on the given link. For instance, a first specific link between two intermediate nodes may have one dedicated protection link already established at the optical layer. This first specific node would have a better protection factor than a second specific link which is a simple Ethernet non-protected link. In the context of the present invention, a source and a destination node are not necessarily end points of a communication, but rather source and destination in the perspective of a path therebetween.

The present invention further suggests using a shortest path algorithm (e.g. Dijkstra algorithm) to calculate a path between the sources and the destination nodes based on the link-weights established taking into account the various protections factors.

Furthermore, the present invention suggests calculating a backup path for links having a higher risk of failure or, in other words, for links having a protection factor that is not satisfactory.

The present invention does not aim at providing an optimal protection-factor setting algorithm, but rather takes for granted that the protection-factor assignment work has been performed (centrally or de-centrally, manually or automatically e.g. based on known characteristics of a given network's topology). The protection-factor setting is subject to further development in regard to the present invention.

For the purpose of the present exemplary discussion, five protection levels are identified for a link:
1. No protection: the link is not protected at another layer.
2. Shared 1:N: The link is already protected by a protection-link (or group of protection-links), but further links also share the same protection protection-link.
3. Dedicated 1:1: the link is already protected by a dedicated (but not yet used) protection-link.
4. Dedicated 1+1: the link is already protected by a dedicated protection-link used as an active alternate link.
5. Enhanced: the link is already protected by scheme better than 'dedicated 1+1'.

While these levels of protection are well known in the art, the invention is not limited to those or to using all of them. To each protection level, a numerical value (protection-factor) is used by the various algorithms to be discussed hereinafter. The numerical value can also be referred to as protection, protection-factor or protection-factor value in this document. The numerical values used during the experimentation phase of the present invention are shown in Table 1.

TABLE 1

Numerical value of the protection-factor

| Protection level | Value of the protection-factor |
|---|---|
| Enhanced | 10 |
| Dedicated 1 + 1 | 100 |
| Dedicated 1:1 | 1000 |
| Shared 1:N | 10000 |
| No protection | 1000000 |

The preceding protection-factor values are set to be able to demonstrate the potential of the invention (and the simplicity with which the protection-factor could be set). Note that lower value means a better protection level. The opposite could also be used (i.e., higher value meaning better protection level), but the actual formulation of the algorithm given below would have to be adjusted. In the context of the present invention, an intermediate protection value is neither the highest nor the lowest value of Table 1 and is determined (outside the scope of the present example) in terms of expected results. Examples of intermediate protection value will be given below within the actual examples. This is subject to potential further research to better set the intermediate protection value.

Figure 1:
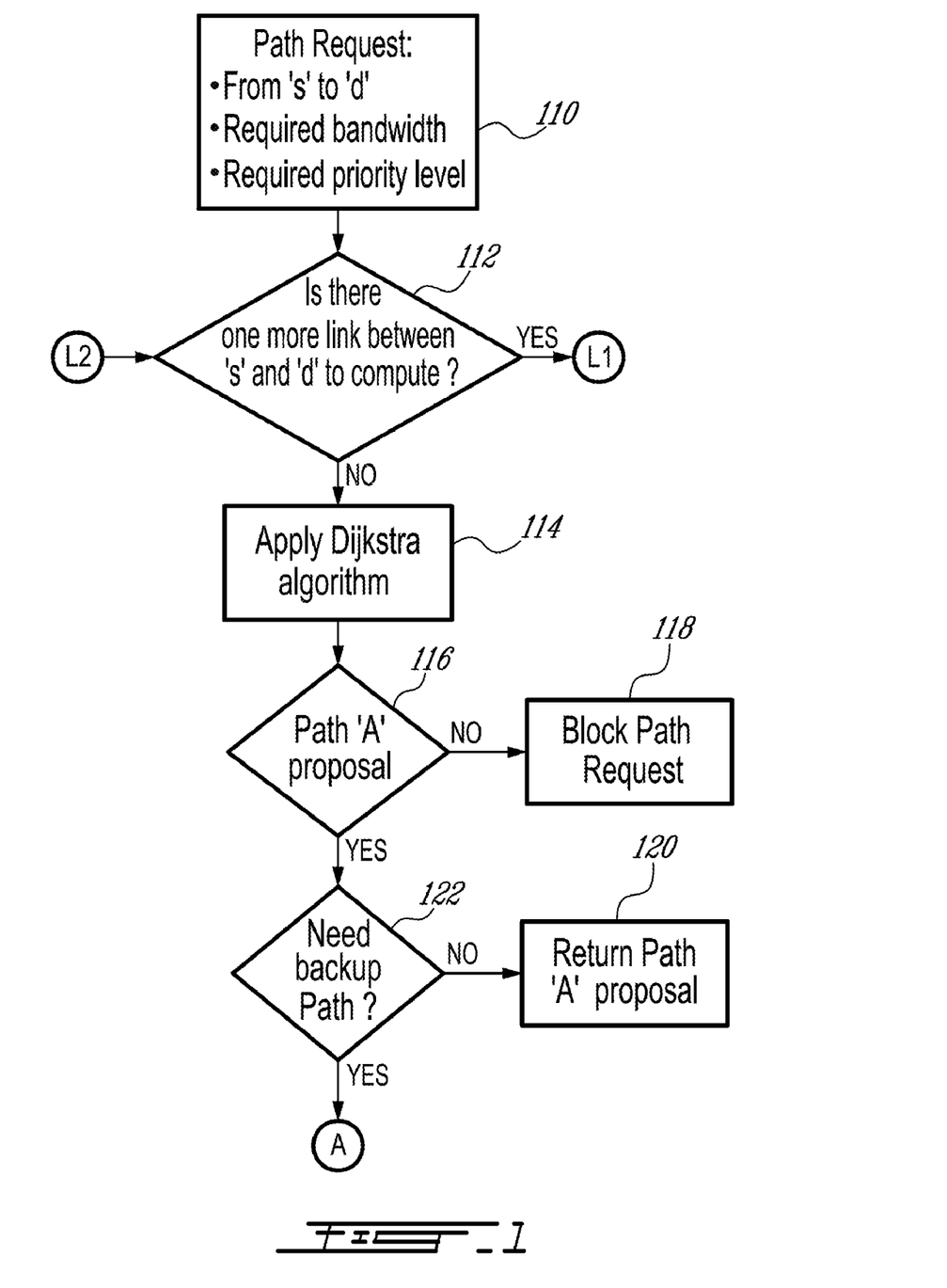
FIG. 1 shows an exemplary flow chart of a path establishment algorithm in accordance with the teachings of the present invention.

Reference is now made to the drawings, in which FIG. 1 is an exemplary flow chart of a path establishment algorithm in accordance with the teachings of the present invention. The examples of FIG. 1 to FIG. 4 mainly suggest a centrally controlled path establishment mechanism (e.g., implemented in an IP Edge Node, Border Edge Node or Access node, especially in the context of Next Generation Network (NGN)). However, it is also possible to use some or all of the new and inventive features of the present invention without recourse to the centrally controlled architecture. Therefore, during the description of the FIGS. 1-4, notions of how the algorithms can be made decentralized may also be included.

In FIG. 1, a path request 110 is received in a node to establish a path between a source node 'S' and a destination node 'D' of a network. The path request 110 further includes a bandwidth requirement and, potentially, a priority level or resilience class requirement. As will be apparent in the next lines, the bandwidth requirement is used to establish a link-weight for potential links between S and D. The link-weights take into account the available resources in the network as well as the protection-factors. The link-weights can also potentially take the resilience class into consideration. Some more Quality of Service (QoS) requirements may further be included in the path request 110. Those other requirements could be taken into account in generally the same way as the resilience class or bandwidth requirements, i.e., by enabling distinguished link-weights establishment based on requested limits. However, for simplicity purposes, only the resilience class and bandwidth requirements will be discussed in more details. The resilience class referred to in the present description is limited to Low, Medium and High. However, more resilience classes could be used. For instance, the Low resilience class could be associated to the known RC4 while the High resilience class could be associated to the RC1 class. The known RC2 and RC3 resilience classes would thus both be considered Medium. That being said, some aspects of the present invention could thus be refined (e.g., having different predetermined values/thresholds) in terms of more resilience classes.

Figure 2:
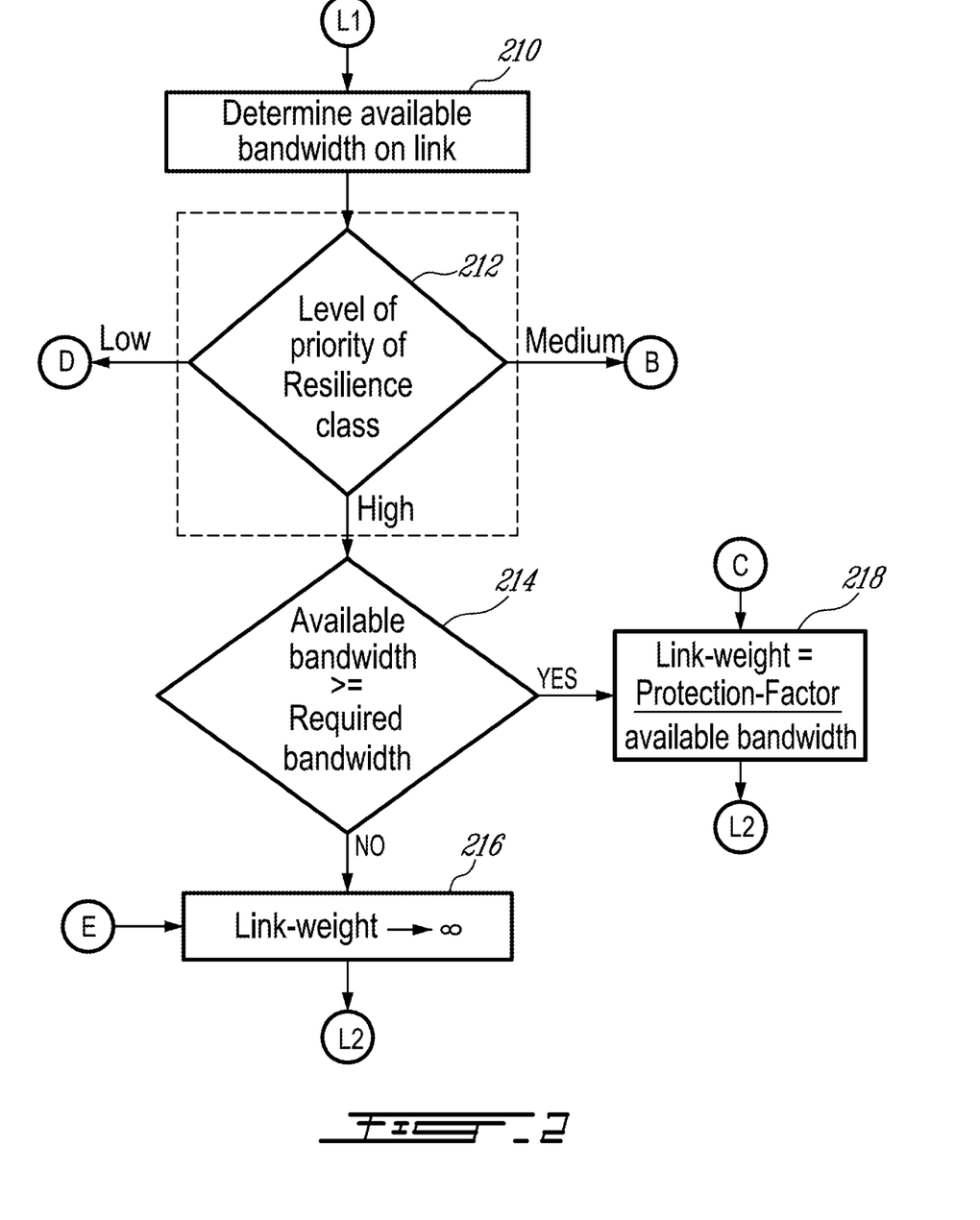
FIG. 2 shows an exemplary flow chart of a link-weight establishment algorithm in accordance with the teachings of the present invention.

After the reception of the path request 110, the node establishes link-weights for a plurality of links between S and D (112). More details of the link-weights establishment algorithm are shown in FIG. 2, which will be described later on. At this point, it is sufficient to note that the link-weight establishment algorithm is executed for some or all potential links between S and D. Some links may not be processed for various reasons (known as defective, do not allow to reach D, etc.). Once all the links that needed to be processed are processed (i.e., obtained a link-weight), the node proceeds with a shortest path algorithm (114) (e.g., Dijkstra) using the link-weights. A verification is performed on the output of the shortest path algorithm (116) so that the path request 110 is blocked if no path proposal is returned (118) from the step 114. If a path proposal (e.g. path A) is returned, it is possible to return the path proposal directly in response to the path request 110 (120). However, it is also possible to verify if a backup path (or path portion) is required (122) and to return the path proposal at this stage (120) only if no backup path is needed.

Figure 3:
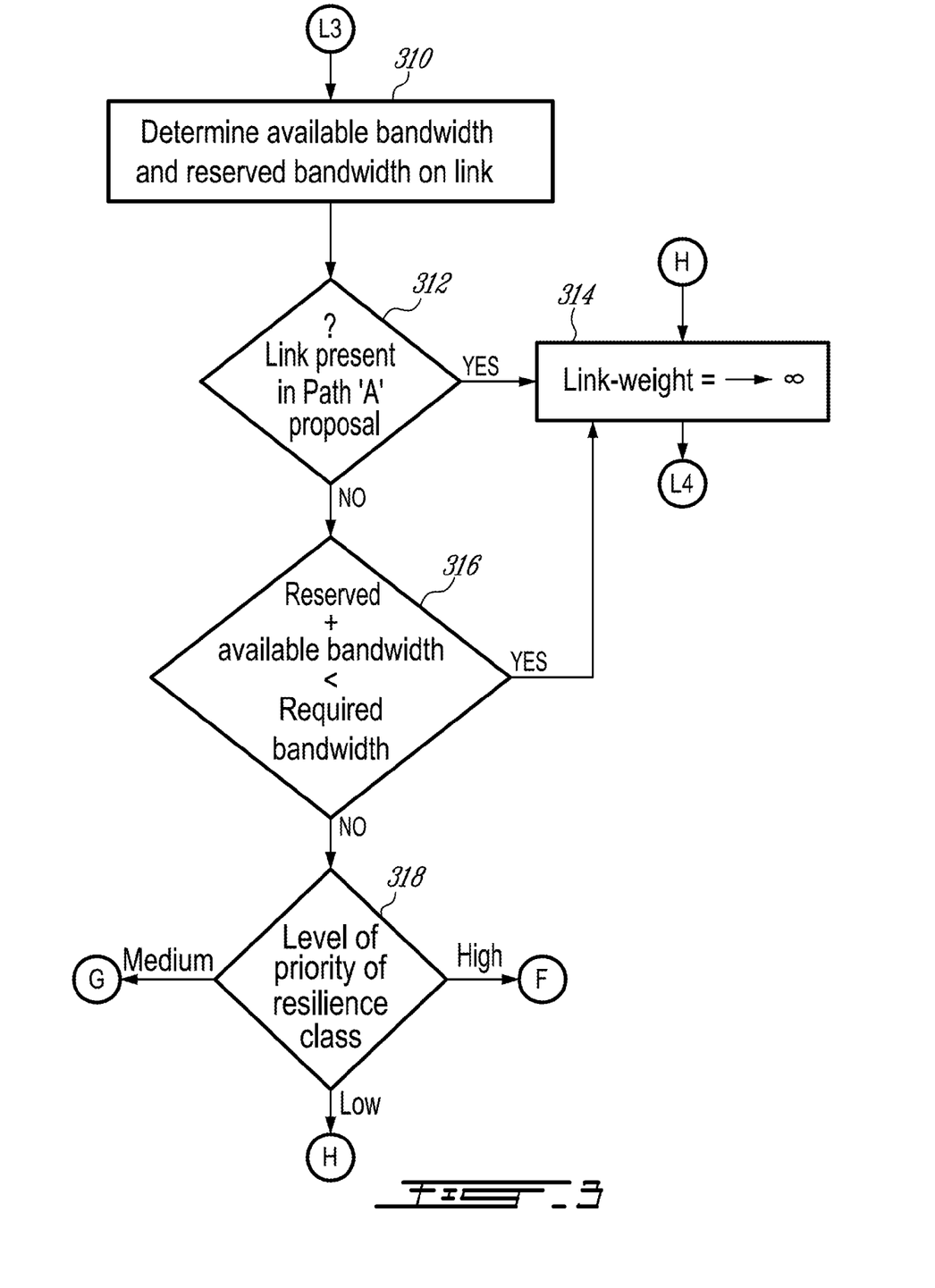
FIG. 3 shows an exemplary flow chart of a protection-link-weight establishment algorithm in accordance with the teachings of the present invention.

If a backup path (or backup portion for the path A) is needed, FIG. 1 follows to point A. As needed, protection-link-weights between S and D are computed (124). More details of the protection-link-weights establishment algorithm are shown in FIG. 3, which will be described later on. At this point, it is sufficient to note that the protection-link-weight establishment algorithm is executed for some or all potential protection-links between S and D. The need to establish protection-link-weight ('as needed') is likely to be assessed based on the protection-factor of the link composing the path proposal. For instance, the protection-factor of each link in the path proposal can be checked against a threshold protection-factor to determine if the given link requires a backup link. The threshold value could be set in view of the resilience class requirement (if present). Alternatively, a complete backup path proposal could be computed for the path proposal.

No matter, what is the level of need for a backup path, the results of the protection-link-weights establishment is to execute a shortest path algorithm, at least once, based on the obtained protection-link-weights (126). More than one executions of the shortest path algorithm could be necessary, for instance, if constraints on links to be avoided need to be added. A verification is performed on the output of the shortest path algorithm (128) so that the path request 110 is blocked if no valid backup path proposal is returned (130) from the step 126. If all necessary backup path proposal(s) (e.g. path B) is returned, all the path proposals (e.g., path A and B) are returned in response to the path request 110 (132). It is also possible to refresh the proposal(s) after a certain time (e.g., $\Delta t$) (134), either spontaneously or based on information received in the path request 110. The step 134 can also be executed after the step 120.

FIG. 2 is an exemplary flow chart of a link-weight establishment algorithm in accordance with the teachings of the present invention. The link-weight establishment algorithm could activated for one link at a time, by the path establishment algorithm of FIG. 1 but could also be activated within a node that is part of a potential path (e.g., if a path is established on a hop-by-hop basis). The link-weight establishment algorithm could also be activated spontaneously by a node for other routing purposes, without relation to path management (i.e., no path request or the like). In the example of FIG. 2, for clarity purposes, all types of activation will be referred to as a path request, the hop-by hop aspect corresponding to a path request where the current node is the source and the next hop is the destination. FIG. 2 shows a starting point L1 and an end point L2 which are applicable with regards to the example represented on FIG. 1. The activation of the link-weight establishment algorithm will have a bandwidth requirement associated therewith (linked to a path request or local traffic request) and can further have a resilience class (priority level) requirement (linked to a path request or local traffic request). In the example of FIG. 2, the link being treated is referred to as the current link. It is assumed that the protection-factor associated to the current link is readily available. A step of determining the protection-factor of the current link could be needed (not shown).

The first step of the link-weight establishment algorithm is to determine available bandwidth for the current link (210). In the context of the present algorithm, the available bandwidth is the bandwidth that is not used and not reserved on the current link. It is likely to be determined at the time the step 210 is performed, but many statistical aspects (average, standard deviation, acceptable degradation factor, time of the day vs. past experience, etc.) could be considered in determining the available bandwidth 210 (which falls outside the scope of the present invention). If applicable, the resilience class (priority level) could be assessed (212) to determine the exact calculation that will be performed to establish the link-weight of the current link. As will be made apparent in the next lines, the calculations can all be described as a computation of the protection-factor of the current link with the available bandwidth value for the current link. The various details of the calculations are described below in relation to more specific examples.

In case the level of priority is determined at the step 212 to be High (or, more generally, in the cases where no priority level is assessed), the example of FIG. 2 follows with a verification that the available bandwidth is greater than (or potentially equal to in certain implementations) the bandwidth requirement. If the available bandwidth is not enough to accommodate the bandwidth requirement, than the link-weight is set to a value that indicates that the current link should not be part of the potential path (216). Logically, this value is usually referred to an infinite value (as shown on FIG. 2). Technically, this value is usually the highest acceptable value depending on the way the values are stored. However, any value could, in fact be put as long as it is a clear indication that the current link should be avoided.

If the available bandwidth is enough to accommodate the bandwidth requirement, than the link-weight is set by computing the protection-factor associated to the link with the available bandwidth value for the current link (218). In the present case, computing the protection-factor associated to the link with the available bandwidth value for the current link is done by dividing the protection-factor by the available bandwidth value.

In case the level of priority is determined at the step 212 to be Medium (B), the example of FIG. 2 follows at (B) with a verification that the available bandwidth is greater than (or potentially equal to in certain implementations) the bandwidth requirement (220). If the available bandwidth is not enough to accommodate the bandwidth requirement (E), than the link-weight is set to a value that indicates that the current link should not be part of the potential path (step 216).

If the available bandwidth is enough to accommodate the bandwidth requirement, a verification takes place to determine if the protection-factor associated to the current link is greater (i.e. worst) than an intermediate protection value 222 (e.g., in a case of RC2 the intermediate protection value could be the Dedicated 1+1 protection-factor value and in a case of RC3 the Dedicated 1:1 protection-factor value). If the protection-factor of the current link is greater than the intermediate value, than computing the protection-factor associated to the link with the available bandwidth value for the current link is performed by dividing the protection-factor associate to the shared protection level by the available bandwidth value (224). This results in an increased link-weight (i.e. lower probability of selection) for the current link if it presents a high level of protection. The shared protection value is used in this case as in the simulation performed during the conception of the invention, but further research could demonstrate that a more precise predetermined protection value could be used to improve the result.

If the protection-factor of the current link is not greater than the intermediate value (C), than computing the protection-factor associated to the link with the available bandwidth value for the current link is performed by dividing the protection-factor of the current link level by the available bandwidth value (218).

In the example given above, the steps 222, 224 and 218 could be considered as a variant of the computation of the protection-factor associated to the link with the available bandwidth value for the current link.

The step 212 could also determine that the level of priority is Low (D). A value Cr equal to the following formula is used in this case.

$$Cr = (available\_bandwidth) + (reserved\_bandwidth) - bandwidth\_low\_traffic$$

The reserved_bandwidth value corresponds to the amount of bandwidth currently reserved but not used on the current link (it may be readily available, but could also require a determination, that is not shown at this stage). The bandwidth_low_traffic value corresponds to the amount of bandwidth currently used by low level priority traffic (it may be readily available, but could also require a determination, that is not shown).

The example of FIG. 2 follows at (D) with a verification that Cr is smaller than (or potentially equal to in certain implementations) the bandwidth requirement (226). If so, (E) the link-weight is set to a value that indicates that the current link should not be part of the potential path (step 216). If the step 226 determined that Cr is not smaller than (or is potentially equal to in certain implementations) the bandwidth requirement, than the computation of the protection-factor associated to the link with the available bandwidth value for the current link is done by dividing Cr by the protection-factor of the current link.

FIG. 3 is an exemplary flow chart of a protection-link-weight establishment algorithm in accordance with the teachings of the present invention. FIG. 3 shows a starting point L3 and an end point L4 which are applicable with regards to the example represented on FIG. 1. The same comments with regards to the activation of the link-weight establishment algorithm of FIG. 2 apply to the protection-link-weight establishment algorithm of FIG. 3. The same information (e.g., protection-factor, resilience class (if applicable), etc.) is also presumed available. In the example of FIG. 3, the link being treated is referred to as the current protection-link.

FIG. 3 starts with determination of the available bandwidth value and reserved bandwidth value for the current protection-link (310) (the definition of those two concepts is not changed). A verification follows to determine if the current protection-link is present in the proposed path previously computed (312). If so, the protection-link-weight of the protection-link is established or set to a value indicating that the protection-link should not be used to protect the proposed path (314). The comments related to the value itself in the description of the step 216 are applicable here as well.

If the current protection-link is not present in the proposed path previously computed, a verification of the addition of the available bandwidth value and the reserved bandwidth for the current protection-link is made (316). If the addition of the available bandwidth value and the reserved bandwidth for the protection-link is smaller than the bandwidth requirement associated to the proposed path, then (H) the protection-link is established or set to a value indicating that the protection-link should not be used to protect the proposed path (314).

Otherwise, the protection-link-weight of the current protection-link is set by computing the protection-factor associated to the protection-link with the reserved bandwidth on protection-link and the bandwidth requirement associated to the proposed path. Various combinations of steps representing the computation of the protection-factor associated to the protection-link with the reserved bandwidth on protection-link and the bandwidth requirement associated to the proposed path are shown hereinafter.

If applicable, the resilience class (priority level) could be assessed (318) to determine the exact calculation that will be performed to establish the protection-link-weight of the current protection-link. In case the level of priority is determined at the step 318 to be High (or, more generally, in the cases where no priority level is assessed), the example of FIG. 3 follows with (F) a step of computing the protection-link-weight of the current protection-link (320) being performed by the following mathematical formula:

$$\frac{1}{(\text{protection factor}) \cdot (\max(\text{reserved bandwidth}, \text{required bandwidth}))}$$

In case the level of priority is determined at the step 318 to be Medium, the example of FIG. 3 follows with (G) a step of computing the protection-link-weight of the current protection-link (322) being performed by the following mathematical formula:

$$\frac{1}{(\text{protection factor}) \cdot (\max(\text{reserved bandwidth}, (\text{degradation factor}) \cdot (\text{required bandwidth})))}$$

The degradation factor is the only new value and represents a value between 0 and 1 through which the requirement can be lessened in case of Medium class requirement. It can be readily appreciated that a value of 1 brings the Medium and High determination to the same formula. A low value means that the required bandwidth could be degraded if the protection-link was ever activated.

In case the level of priority is determined at the step 318 to be Low, the example of FIG. 3 follows with (H) the protection-link is established or set to a value indicating that the protection-link should not be used to protect the proposed path (314).

The resilience class examples of FIGS. 2 and 3 are subject to modifications without affecting the teachings of the invention. For instance, in the case discussed in the paragraph above, it could be determined via further research that a protection-link, and therefore a more refined computation than H, could be useful even if the resilience class is Low.

Figure 4:
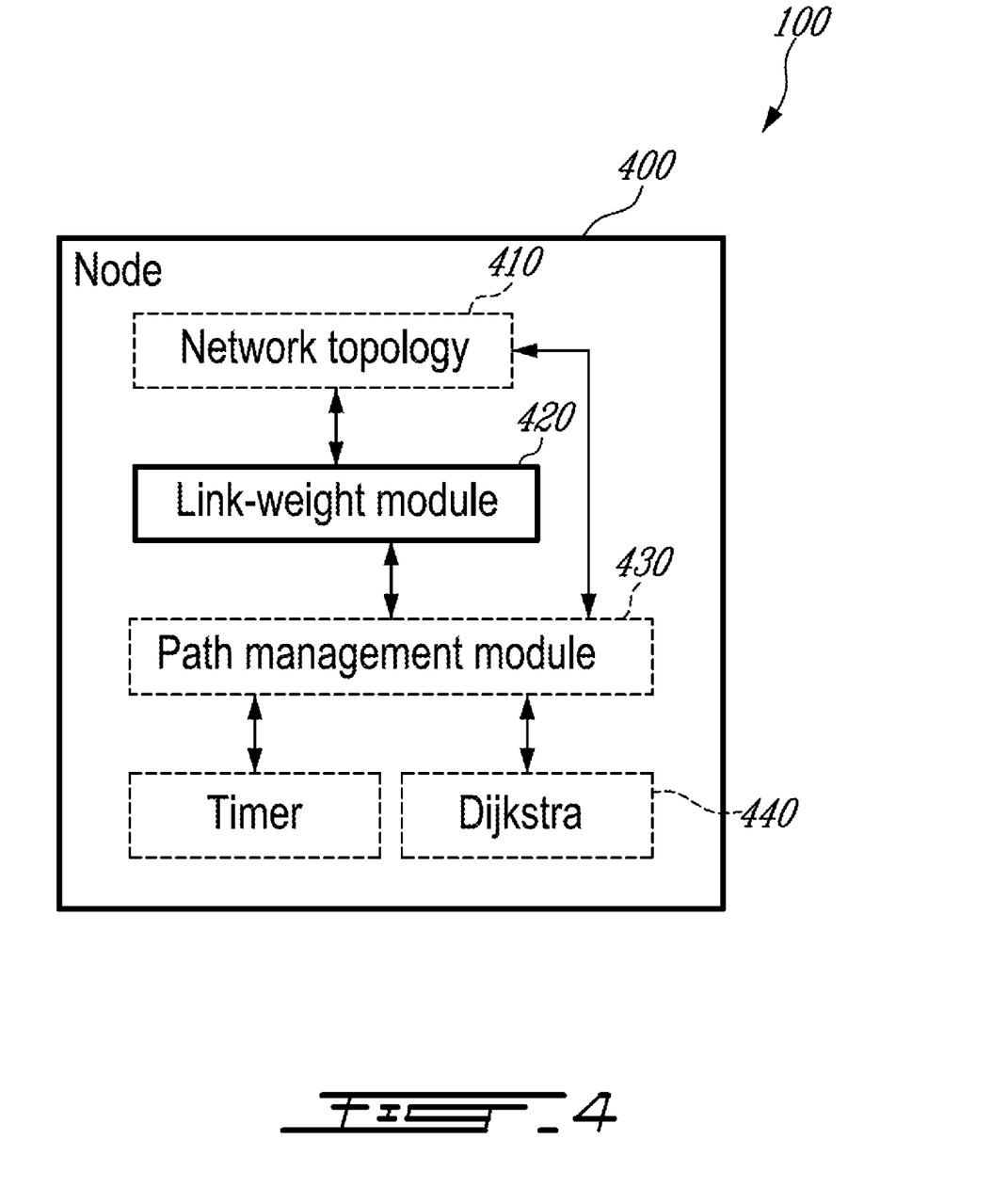
FIG. 4 shows an exemplary modular representation of a node in accordance with the teachings of the present invention.

FIG. 4 is an exemplary modular representation of a node 400 in a network 100 in accordance with the teachings of the present invention. The node 400 is involved in the establishment of a potential path having an associated bandwidth requirement. Being involved means that the node 400 is part of the decision or control layer of the network or that the node 400 is on the potential path. The potential path is between a source node and a destination node in the network. The node comprises a network-topology module 410 that maintains at least a subset of the network's topology. The subset comprises a bandwidth availability value and a protection factor for each of a plurality of links that are part of the subset.

The node 400 also comprises a link-weight module 420 that establishes a link-weight for a first link of the plurality of links by. The establishment is performed by determining a bandwidth availability value for the first link from the topology, determining a protection-factor for the first link from the topology and verifying if the bandwidth availability value for the first link is equal to or greater than the bandwidth requirement associated to the potential path. If so, the link-weight of the first link is set by computing the protection-factor for the first link with the bandwidth availability value for the first link. If not so, the link weight of the first link is set to a value that indicates that the first link should not be part of the potential path.

The node 400 may further comprise a path management module 430 that receives a request for establishment of the potential path between the source node and the destination node and further builds a primary-path proposal for the potential path. The primary-path proposal is built by the path management module 430 by first obtaining link-weight information from the link-weight module for a plurality of links between the source node and the destination node. The link-weight module establishes a link-weight for each of the plurality of links between the source node and the destination node. The path management module 430 then applies a shortest path algorithm using the obtained link-weights and thereby obtains a path proposal comprising a plurality of primary-links from the plurality of links between the source node and the destination node. The shortest path algorithm could be executed in a further module (e.g., a Dijkstra module 440).

In the example of FIG. 4, the node 400 may be traversed by the potential path. In that sense, the subset may comprise only links that connects with the node 400. It should, however, be understood that the subset could be more complete even if the node 400 traversed by the potential. The node 400 could also be outside the potential path and providing information to further nodes thereon.

The subset of the node 400 may further comprise a reserved bandwidth value for each of the links of the subset. The link-weight module 420 may then further establish a protection-link-weight for a second link of the plurality of links. The protection-link establishment is done by determining a bandwidth availability value for the second link, a protection-factor for the second link and a reserved bandwidth value for the second link from the topology 410. If the second link is the same as the first link, the protection-link-weight of the second link is set to a value indicating that the second link should not be used to protect the potential path. If not so, The link-weight module 420 may then further verify if the addition of the bandwidth availability value and the reserved bandwidth value for the second link is equal to or greater than the bandwidth requirement associated to the potential path. If so, the protection-link-weight of the second link is set by computing the protection-factor associated to the second link with the reserved bandwidth value and the bandwidth requirement associated to the potential path. If not so, the protection-link weight of the second link is set to a value indicating that the second link should not be used to protect the potential path.

The path management module 430 may further build a protection-path proposal for the potential path. This is done by first obtaining protection-link-weight information from the link-weight module for the plurality of links between the source node and the destination node. The link-weight module 420 establishes a protection-link-weight for each of the plurality of links between the source node and the destination node that have a protection factor worst than a threshold. Then, the path management module 430 applies a shortest path algorithm using the obtained protection-link-weights and thereby obtains a protection-path proposal comprising a plurality of protection-links from the plurality of links between the source node and the destination node.

The present invention could also be expressed as a method for obtaining a complete-path proposal between a source node and a destination node. In this context, the complete-path proposal comprises a primary-path proposal and, potentially and as needed based on the above, a protection-path proposal. The complete-path proposal further has an associated bandwidth requirement. Another prerequisite is also that there exists more than one chain of links (e.g., partly or completely independent network routes) between the source node and the destination node.

The method for obtaining a complete-path proposal starts by establishing one link-weight per link of a plurality of links between the source node and the destination node. Based on the established link-weights, a shortest path algorithm is applied, which provides a primary-path proposal comprising a plurality of primary-links from the plurality of links.

Then, for each primary-link comprised in the primary-path proposal, a verification could be performed to determine whether a level of protection of the primary-link is worst than a threshold value (e.g., if a link is considered risky). If it is the case, a further step of establishing one protection-link-weight per link of a plurality of links between the source node and the destination node could be performed. It is then followed with an application of a shortest path algorithm to the established protection-link-weights. A protection-path proposal comprising a plurality of protection-links from the plurality of links is thereby obtained. The complete-path proposal is thereafter obtained from the primary-path proposal and, potentially, the protection-path proposal if it exists. The steps described above for obtaining the complete path proposal could also be performed again upon expiration of a timer.

Although several preferred embodiments of the present invention have been illustrated in the accompanying drawings and described in the foregoing description, it will be understood that the invention is not limited to the embodiments disclosed, but is capable of numerous rearrangements, modifications and substitutions without departing from the teachings of the present invention. For example, even though the Figures present a single node handling the various algorithm, a cluster of nodes could further performed the task transparently and this is, thus, not to be construed as a pre-requisite of the present invention. In general, statements made in the description of the present invention do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale. Furthermore, the order in which the various steps are performed is necessarily important to the results of the various algorithms. For instance, there are multiple ways of ordering the bandwidth verification steps and the potential priority level verifications (e.g., compare the ordering of steps 212-214 and 316-318).

What is claimed is:

1. A method for establishing protection-link-weight of a protection-link protecting a portion of a proposed path between a source node and a destination node, wherein the proposed path has an associated bandwidth requirement and an associated resilience class which indicates a priority level of the proposed path, and wherein the protection-link has an associated protection-factor, the protection-factor being set in relation to the level of protection available on the protection-link, the method comprising the steps of:
   in a node involved in establishment of the proposed path, determining an available bandwidth value for the protection-link;
   in the node involved in the establishment of the proposed path, determining a reserved bandwidth value for the protection-link, reserved bandwidth being reserved but not currently used; and
   in the node involved in the establishment of the proposed path, verifying if the protection-link is present in the proposed path:
      if so, establishing the protection-link-weight of the protection-link to a value indicating that the protection-link should not be used to protect the proposed path; and
      if not so and if the resilience class is a high resilience class, verifying if the addition of the available bandwidth value and the reserved bandwidth for the protection-link is equal to or greater than the bandwidth requirement associated to the proposed path:
         if so, establishing the protection-link-weight of the protection-link by computing the protection-factor associated to the protection-link with the reserved bandwidth on protection-link and the bandwidth requirement associated to the proposed path; and
         if not so, establishing the protection-link weight of the protection-link to a value indicating that the protection-link should not be used to protect the proposed path.

2. The method of claim 1 wherein the step of computing is performed by the following mathematical formula, wherein the protection-link weight equals:

$$\frac{1}{(\text{protection factor}) \cdot (\max(\text{reserved bandwidth}, \text{required bandwidth}))}$$

3. The method of claim 1 wherein the method further comprises the step of, if the resilience class is a medium resilience class, executing the step of verifying if the addition of the available bandwidth value and the reserved bandwidth for the protection-link is equal to or greater than the bandwidth requirement associated to the proposed path, wherein the step of establishing the protection-link-weight of the protection-link by computing the protection-factor associated to the protection-link with the reserved bandwidth on protection-link and the bandwidth requirement associated to the proposed path further comprises further computing a degradation factor associated to the protection-link with the bandwidth requirement associated to the proposed path.

4. The method of claim 3 wherein the step of computing is performed by the following mathematical formula, wherein the protection-link weight equals:

$$\frac{1}{(\text{protection factor}) \cdot (\max(\text{reserved bandwidth}, (\text{degradation factor}) \cdot (\text{required bandwidth})))}$$

5. The method of claim 1 wherein the method further comprises the step of, if the resilience class is a low resilience class, establishing the protection-link-weight of the protection-link to a value indicating that the protection-link should not be used to protect the proposed path.

6. A node for establishing protection-link-weight of a protection-link protecting a portion of a proposed path between a source node and a destination node, wherein the proposed path has an associated bandwidth requirement and an associated resilience class which indicates a priority level of the proposed path, and wherein the protection link has an associated protection-factor, the protection-factor being set in relation to the level of protection available on the protection-link, the node comprising:
   a link-weight module that:
      determines an available bandwidth value for the protection-link;
      determines a reserved bandwidth value for the protection-link, reserved bandwidth being reserved but not currently used; and
      verifies if the protection-link is present in the proposed path:

if so, establishes the protection-link-weight of the protection-link to a value indicating that the protection-link should not be used to protect the proposed path; and if not so and if the resilience class is a high resilience class, verifies if the addition of the available bandwidth value and the reserved bandwidth for the protection-link is equal to or greater than the bandwidth requirement associated to the proposed path:

if so, establishes the protection-link-weight of the protection-link by computing the protection-factor associated to the protection-link with the reserved bandwidth on protection-link and the bandwidth requirement associated to the proposed path; and if not so, establishes the protection-link weight of the protection-link to a value indicating that the protection-link should not be used to protect the proposed path.

7. The node of claim 6 wherein computing is performed by the following mathematical formula, wherein the protection-link weight equals:

$$\frac{1}{(\text{protection factor}) \cdot (\max(\text{reserved bandwidth}, \text{required bandwidth}))}$$

8. The node of claim 6 wherein the link-weight module further, if the resilience class is a medium resilience class, verifies if the addition of the available bandwidth value and the reserved bandwidth for the protection-link is equal to or greater than the bandwidth requirement associated to the proposed path and establishes the protection-link-weight of the protection-link by computing the protection-factor associated to the protection-link with the reserved bandwidth on protection-link and the bandwidth requirement associated to the proposed path further comprises further computing a degradation factor associated to the protection-link with the bandwidth requirement associated to the proposed path.

9. The node of claim 8 wherein computing is performed by the following mathematical formula, wherein the protection-link weight equals:

$$\frac{1}{(\text{protection factor}) \cdot (\max(\text{reserved bandwidth}, (\text{degradation factor}) \cdot (\text{required bandwidth})))}$$

10. The node of claim 6 wherein the link-weight module further, if the resilience class is a low resilience class, establishes the protection-link-weight of the protection-link to a value indicating that the protection-link should not be used to protect the proposed path.

11. A method for establishing link-weight of a link on a potential path between a source node and a destination node, wherein the potential path has an associated bandwidth requirement and an associated resilience class which indicates a priority level of the potential path, the method comprising the steps of:

in a node involved in establishment of potential path, determining a protection-factor associated to the link, wherein the protection-factor quantifies a level of protection already existing on the link;

in the node involved in establishment of the potential path, determining an available bandwidth value for the link;

in the node involved in the establishment of the potential path, if the resilience class is a high resilience class verifying if the available bandwidth value for the link is equal to or greater than the bandwidth requirement associated to the potential path:

if so, establishing the link-weight of the link by computing the protection-factor associated to the link with the available bandwidth value for the link; and if not so, establishing the link weight of the link to a value that indicates that the link should not be part of the potential path;

in the node involved in the establishment of the potential path, if the resilience class is a medium resilience class, verifying if the available bandwidth value for the link is equal to or greater than the bandwidth requirement associated to the potential path:

if the available bandwidth value for the link is equal to or greater than the bandwidth requirement associated to the potential path, verifying if the protection-factor associated to the link is higher than an intermediate protection value:

if the protection-factor of the link is higher than an intermediate protection value, establishing the link-weight of the link by computing the protection-factor associated to the link with the available bandwidth value for the link; and if the protection-factor associated to the link is not higher than an intermediate protection value, establishing the link-weight of the link by computing a predetermined protection value with the available bandwidth value for the link; and if the available bandwidth value for the link is smaller than the bandwidth requirement associated to the potential path, establishing the link weight of the link to a value indicating that the link should not be part of the potential path.

12. The method of claim 11 wherein the step of verifying is performed by verifying if the available bandwidth value for the link is strictly greater than the bandwidth requirement associated to the potential path.

13. The method of claim 11 wherein the step of establishing the link-weight of the link by computing the protection-factor associated to the link with the available bandwidth value for the link is performed by dividing the protection-factor associated to the link by the available bandwidth value for the link.

14. The method of claim 11 wherein the step of establishing the link weight of the link to a value high enough to indicate that the link should not be part of the potential path is performed by establishing the link weight of the link to the highest acceptable value.

15. The method of claim 11 wherein the value of the protection factor is high when the level of protection is "No protection" and is lower when the level of protection is higher than "No protection".

16. The method of claim 11 wherein the value of the protection factor is intermediate when the level of protection is higher than "No protection" and lower than "Enhanced".

17. A method for establishing link-weight of a link on a potential path between a source node and a destination node, wherein the potential path has an associated bandwidth requirement and an associated resilience class which indicates a priority level of the potential path, the method comprising the steps of:

in a node involved in establishment of the potential path, determining a protection-factor associated to the link, wherein the protection-factor quantifies a level of protection already existing on the link;

in the node involved in establishment of the potential path, determining an available bandwidth value for the link;

in the node involved in the establishment of the potential path, if the resilience class is a high resilience class verifying if the available bandwidth value for the link is equal to or greater than the bandwidth requirement associated to the potential path:

if so, establishing the link-weight of the link by computing the protection-factor associated to the link with the available bandwidth value for the link; and if not so, establishing the link weight of the link to a value that indicates that the link should not be part of the potential path; and in the node involved in the establishment of the potential path, if the resilience class is a low resilience class:

calculating a remaining bandwidth value for the link equal to (the available bandwidth value for the link)+(a reserved bandwidth value for the link)−(a bandwidth value for the link already used by low resilience class traffic); and verifying if the remaining bandwidth value for the link is equal to or greater than the bandwidth requirement associated to the potential path:

if so, establishing the link weight of the link by computing the remaining bandwidth value for the link with the protection-factor associated to the link; and if not so, establishing the link weight of the link to a value indicating that the link should not be part of the potential path.

18. The method of claim 12 wherein the step of establishing the link-weight of the link by computing the protection-factor associated to the link with the available bandwidth value for the link is performed by dividing the protection-factor associated to the link by the available bandwidth value for the link.

19. The method of claim 12 wherein the value of the protection factor is high when the level of protection is "No protection" and is lower when the level of protection is higher than "No protection".

20. The method of claim 12 wherein the value of the protection factor is intermediate when the level of protection is higher than "No protection" and lower than "Enhanced".

* * * * *